United States Patent [19]

Congleton

[11] E Re. 29,248

[45] Reissued June 7, 1977

[54] CONTAINER

[75] Inventor: Wayne Congleton, Walnut, Calif.

[73] Assignee: Dolco Packaging Corporation, Burbank, Calif.

[22] Filed: Mar. 20, 1975

[21] Appl. No.: 560,436

Related U.S. Patent Documents

Reissue of:

[64] Patent No.: 3,868,054
Issued: Feb. 25, 1975
Appl. No.: 343,605
Filed: Mar. 21, 1973

U.S. Applications:

[63] Continuation-in-part of Ser. No. 273,558, July 20, 1972, Pat. No. 3,834,609.

[52] U.S. Cl. ..... 47/77; 47/84; 47/86; 206/423; 220/23.4; 229/2.5 R; 229/28 R

[51] Int. Cl.[2] ..... B65D 85/52; A01G 9/10

[58] Field of Search ..... 229/2.5, 45, 28 R, 14 C; 47/34.13, 37, 34.11; 206/423, 521, 523; 220/4 E, 23.4; 217/26.5

[56] References Cited

UNITED STATES PATENTS

| | | | |
|---|---|---|---|
| 1,975,128 | 10/1934 | Sherman | 229/2.5 |
| 2,285,129 | 6/1942 | Schwartzberg | 220/2.5 |
| 3,386,607 | 6/1968 | Keene | 229/14 C |
| 3,400,873 | 9/1968 | Bessett | 229/14 C |
| 3,430,838 | 3/1969 | Bessett | 229/45 EC |
| 3,519,189 | 7/1970 | Bambara | 229/2.5 |
| 3,552,595 | 1/1971 | Gerner | 206/521 |
| 3,563,450 | 2/1971 | Dahlberg | 229/45 EC |
| 3,640,379 | 2/1972 | Weingarden | 229/2.5 |
| 3,647,105 | 3/1972 | Keeslar | 220/23.4 |
| 3,739,522 | 6/1973 | Greenbaum | 47/34.13 |
| 3,807,622 | 4/1974 | Belcher et al. | 229/2.5 |

FOREIGN PATENTS OR APPLICATIONS

| | | | |
|---|---|---|---|
| 6,607,668 | 12/1966 | Netherlands | 229/2.5 |
| 772,455 | 4/1957 | United Kingdom | 47/34.13 |

*Primary Examiner*—George E. Lowrance
*Assistant Examiner*—Bruce H. Bernstein
*Attorney, Agent, or Firm*—Nilsson, Robbins, Dalgarn & Berliner

[57] ABSTRACT

An improved container, particularly useful for containing plants, seeds, or seedlings in soil for shipment, is formed of a member which when unassembled is in a generally planar configuration. A plurality of hinge lines formed in the member enable the member to be folded into a configuration having generally a U-shaped cross-section and divide the member into a plurality of predetermined compartments. The container, which can be stacked when unassembled due to the planar configuration, contains a plurality of tab members integrally formed with one of the edges of the container. The free end of the tab is formed with a protuberance for abutting the outer side of the other free edge of the container for assembling the container in the generally U-shaped cross-sectional configuration.

12 Claims, 6 Drawing Figures

Fig. 4.
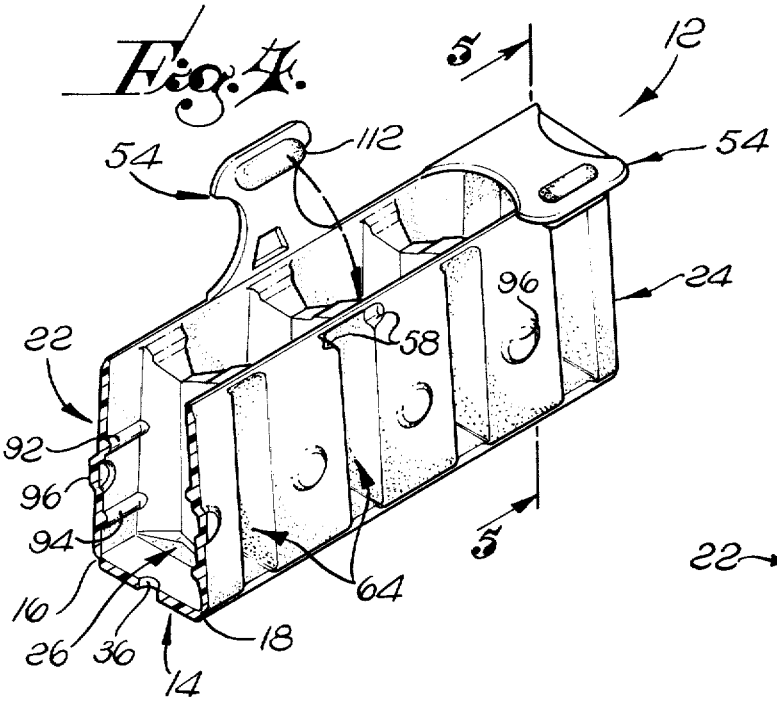
Fig. 5.
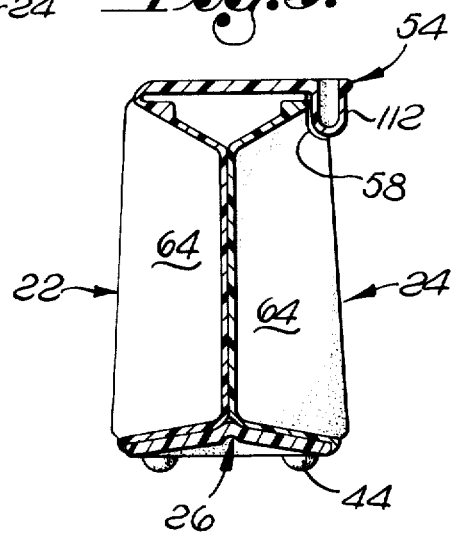
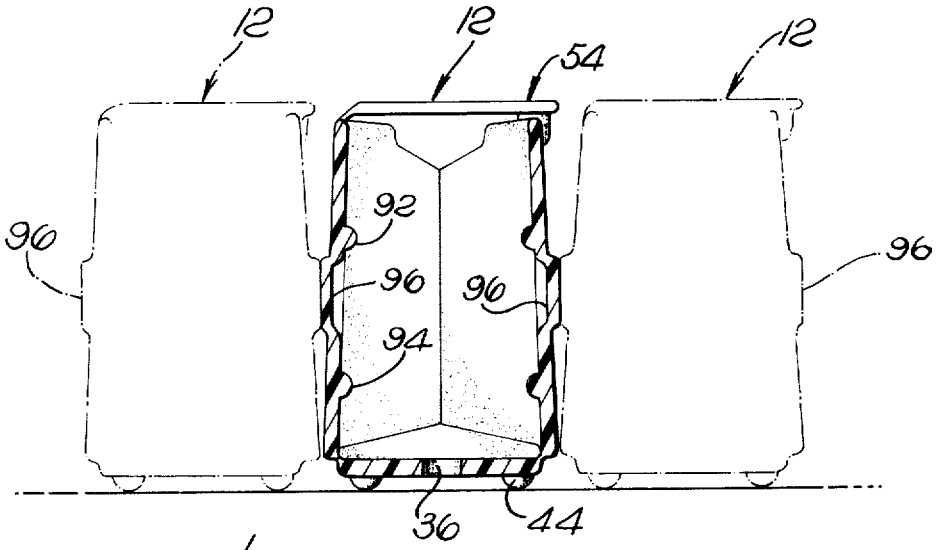
Fig. 6.

CONTAINER

Matter enclosed in heavy brackets [ ] appears in the original patent but forms no part of this reissue specification; matter printed in italics indicates the additions made by reissue.

BACKGROUND AND SUMMARY OF THE INVENTION

The present invention is a continuation in part of U.S. Pat. application No. 273,558, filed July 20, 1972, now U.S. Pat. No. 3,834,609, having a common assignee as the present application.

FIELD OF THE INVENTION

The field of art to which the invention pertains includes container assemblies.

In the shipping of small plants, seedlings and soil packed seeds, it is common to use individual containers therefor with attendant costs and handling disadvantages. In the aforementioned patent application, a container assembly is disclosed, which, when unassembled, is of a generally planar configuration, enabling a plurality of the assemblies to be stacked when unassembled. When the sections of the assembly are folded, the indentations in adjacent sections are positioned so as to divide the container into a plurality of discrete compartments. It has been found, however, that the side walls of the container which are of generally U-shaped cross-sectional configuration tend to return to their original planar configuration. Therefore, it has been necessary to secure the side walls to the center section by use of adhesive which is pre-coated onto the container assembly. Alternatively, a string or other securing device must be utilized to secure the sides together. In addition, when positioning a plurality of assembled containers together, it may be necessary to provide some mechanism for spacing the adjacent sides of the containers from each other so as to provide gripping access to individual container assemblies.

The present invention provides a container assembly which can be stacked flat in a generally planar configuration and stored with a minimum of space. In addition, when the container is assembled for use, the receptacle can be locked so as to retain its assembled structural form and provide a superior shipping container. The container is particularly suitable for containing plants, seeds, seedlings or the like, packed in soil for shipment.

Specifically, the container assembly is formed of a member, which, when unassembled, has a generally planar configuration when stored, and which assembles into a generally U-shaped cross-sectional configuration. The container assembly is divided into a plurality of predetermined compartments by internal hollow ribs formed by indentations in the opposite surface of the walls thereof, which ribs interact when the member is folded. Tab members are integrally formed with, and extend from, at spaced locations along, one of the free edges of the container. The free end of each tab is formed with a protuberance for abutting the outer side of the other free edge of the container, thereby retaining the assembly in a U-shaped cross-sectional configuration. Recesses are provided in said other free edge keyed to the tab protuberances.

Advantageously, the container is formed of sheets of substantially uniform thickness expanded polystyrene.

The springiness of the polystyrene operates in cooperation with the tab retaining mechanism to provide a simple but secure locking function.

Button spacers are provided on the side walls to space laterally adjacent containers of like construction from each other a sufficient distance to accommodate the tab protuberances. A breather hole is provided in the bottom wall of each compartment for drainage, and spacer buttons are disposed thereabout to space the container from the floor of any support and prevent stagnation of soil water.

The advantages of the invention, both as to its construction and mode of operation, will be readily appreciated as the same becomes better understood by reference to the following detailed description when considered in connection with the accompanying drawings, in which like reference numerals designate like parts throughout the figures.

BRIEF DESCRIPTION OF THE DRAWINGS

FIG. 4 is a perspective view of the container of FIG. 1 shown assembled;

FIG. 5 is a cross-sectional view of the assembled container of FIG. 4 taken along the line 5—5 thereof; and FIG. 6 is a cross-sectional view of a portion of the container of FIG. 4 illustrating a plurality of assembled adjacent containers of like construction.

DETAILED DESCRIPTION OF THE DRAWINGS

Figure 1:
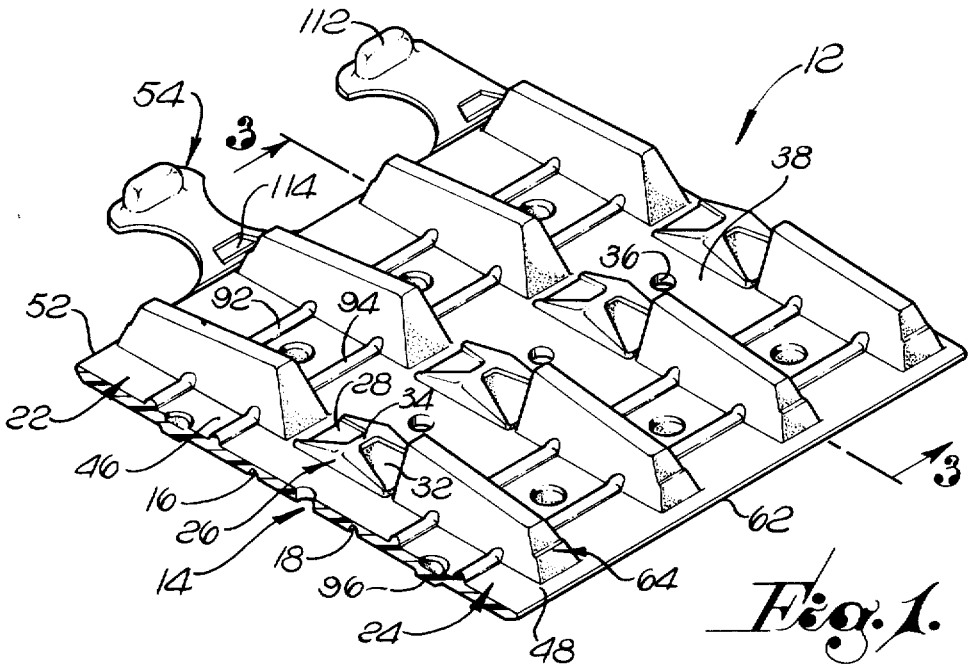
FIG. 1 is a top partial perspective view of a portion of one of the containers in unassembled form.

In the drawings, only a portion of a complete container is illustrated, for simplicity of drawing. Any desired number of compartments can be provided in each container, a typical configuration containing ten compartments.

Figure 2:
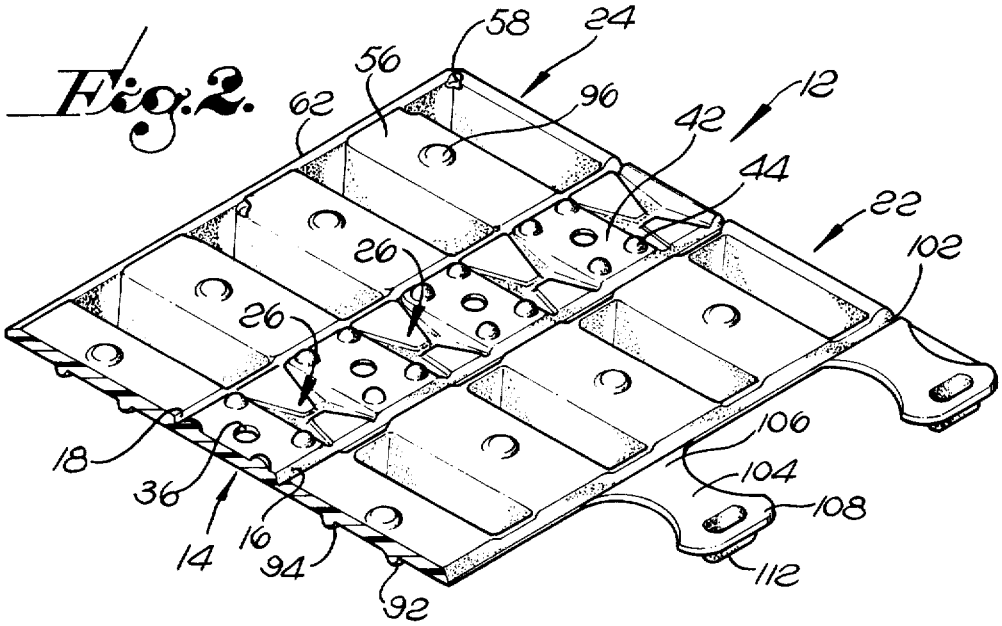
FIG. 2 is a bottom partial perspective view of the container of FIG. 1.
Figure 3:
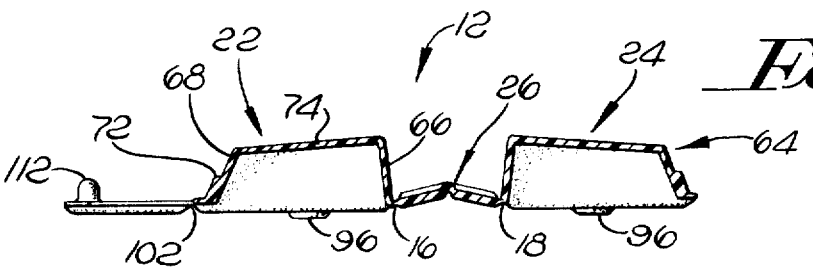
FIG. 3 is a cross-sectional view of the container of FIG. 1 taken along the line 3—3 of FIG. 1.

Referring now to FIGS. 1 and 2, there is shown a container 12 in unassembled form made in accordance with the principles of the invention. The container 12 is formed from sheets of substantially uniform thickness expanded polystyrene and is formed with a plurality of indentations (resulting in hollow protuberances on the opposite side) which allow stacking of a plurality of the container assemblies in unassembled form. The container comprises a central section 14 which is interconnected by hinge lines 16 and 18 to a first side section 22 and a second side section 24, respectively.

The polystyrene sheet is indented to form a plurality of protuberances 26 into the interior of the container spaced along the longitudinal axis of the central section. The protuberances 26 are of generally H-shaped configuration when viewed from the top of FIG. 1, due to recesses 28 and 32 formed therein. The recesses 28 and 32 are formed on opposite sides of a central peak 34 which is a plane parallel to the axis of the central section. The recesses 28 and 32 are of generally trapezoidal shape with the wide base of the trapezoid being adjacent the hinge lines 16 and 18, respectively. Also spaced along the center line of the axis of the central section 14 are openings 36 one each of which is spaced between adjacent protuberances 26. The openings 36 are each positioned in the center of a bottom section 38 defining the bottom surface of each of the container compartments.

Referring now to FIG. 2, the bottom surface 42 of each of the bottom sections 38 is formed with a plurality of spacer buttons 44 in quadrature array around the openings 36. The buttons 44 enable the assembled container to be raised from a surface upon which it is mounted or positioned, as will be explained hereinafter.

The first side section 22 and the second side section 24 which join the central section 14 at the hinge lines 16 and 18, respectively, are mirror images of each other on their interior surfaces 46 and 48, respectively. A free edge 52 of the first side section 2 is integrally formed with a plurality of tab members 54 spaced therealong. The exterior surfaces of the first and second side sections 22 and 24 are identical, with keyways 58, for the tap protuberances, additionally formed adjacent the free edge 62 of the second side section 24.

A plurality of generally trapezoidally shaped hollow ribs 64, defined by tapered surfaces 66, are formed adjacent the hinge line 16 or 18 and are transversely spaced along the interior surfaces of the first and second side sections in planes parallel to central protuberances 26. The tapered shape of each rib 64 is such that when the container assembly is folded in the manner illustrated in FIGS. 4 and 5, and a close fit with the recesses 28 or 32, respectively, of the center section protuberances 26 is formed. The tapered side surface 68 of each rib 64 adjacent the free edges 52 and 62 of the side sections 22 and 24, respectively, is formed with a medially spaced, upwardly facing shoulder 72. The crest 74 of each rib 64 tapers slightly from its proximal end 66 toward its distal end 68 so that when the container assembly is folded as illustrated in FIG. 5, opposed crests 74 of each of the ribs 64 will but each other and fold slightly inwardly at an acute angle respective the bottom, base section 38.

Retaining ridges 92 and 94, respectively, are formed along the axis of the first and second side sections on the interior surfaces thereof and are illustrated as being positioned between adjacent ribs 64. While only two ridges 92 and 94 are shown, it should be understood that one only, or more, could be used or the ridges could be eliminated completely; depending upon the type of material to be packed into the compartments of the container assembly. Indentations 96 forming side buttons on the exterior side sections are positioned between the ridges 92 and 94. As illustrated in FIG. 6, the side buttons 96 on one assembly are juxtaposed with corresponding buttons on an adjacent container assembly, thereby separating the exterior side walls of adjacent containers of like construction.

Referring again to FIGS. 1 and 2, the tab members 54 are spaced along the edge 52 of the first side section 22 adjacent alternate ribs 64 along the axis of the container. However, it should be understood that a tab member could be positioned adjacent each rib or, alternatively, fewer tab members could be utilized.

The tab members 54 are of generally planar configuration and are folded with respect to a free edge 52 of the first side section 22 along a hinge line 102. The opposite edges of each tab member is formed concavely to provide a reduced width central portion 104 which is interconnected to an enlarged width portion 106, secured at the hinge line 102, and an enlarged width portion 108 which forms the distal end of the tab 54. The distal end of each tab 54 is formed with a rounded, elongated, hollow protuberance 112 which faces toward the interior of the container when assembled and which is adapted to be positioned in the keyway 58 formed on the exterior free edge 62 of the second side section 24. Normally, the tab protuberance 112 has a length slightly greater than the width of the trapezoidal rib 64 and the keyway 58 and the tab protuberance 112 are formed with gradually curving surfaces to provide smooth and easy mating thereof.

A depression 114 of generally trapezoidal configuration, is formed on the interior surface of the proximal end of the tab member 54 adjacent the hinge line, so that when the tab member is secured, as shown in FIGS. 4 and 5, sufficient room is provided for enabling the portion of the tab 54 to form a close fit with the distal end of the rib 64.

The length of each tab 54, from its joinder at its proximal end to the inner surface of its protuberance 112, is somewhat less than the width of the base 38 of the container. Such configuration serves to lock the tabs in place against the springiness of the abutting hollow ribs and the natural tendency of the expanded polystyrene sheet material to spring apart along its fold lines. The foregoing characteristics, along with the aforenoted acute angle formed by the side walls and base, afford a locking function which is simple yet highly effective.

The container assembly of FIGS. 1 through 6 can be used to ship seedlings or other types of fragile goods. After the goods have been packed in the container, and the tab members 54 are in an upright position as shown in FIG. 4, a mechanical arm can be utilized to automatically lower the tabs so that they secure the assembly together. When the container is packed with soil, the openings 36 allow air circulation facilitated by the bottom spacer buttons, thereby preventing the accumulation of stagnant water pools. In addition, when the soil in which the seedlings are packed expands due to addition of water, the ridges 92 and 94 serve to retain the soil in the container, should the container be somehow upset. It will be appreciated that a shipping container has been provided which is much more economical than containers heretofore used.

I claim:

[1. An improved container assembly, comprising:

a member which when unassembled is in a generally planar configuration and has first and second side edges;

a plurality of hinge lines formed in said member each along the axis of said container from said first side edge to said second side edge for enabling said member to be folded into a predetermined shape and for dividing the member into a first section, a second section and a central section, said central section interconnecting said first and second sections;

each of said section being formed with a plurality of hollow ribs formed by indentations therein spaced inwardly from the side edges and spaced one from another along the axis of said container, said ribs interacting when said member is folded along said hinge lines so as to form a structure of generally U-shaped cross-sectional configuration having a pair of free edges spaced one from the other which define the ends of said U-shaped configuration, and to divide said container into a plurality of discrete compartments; said a tab member having a first end integrally formed with one of said edges and a free end adapted to be positioned adjacent the other of said edges for retaining said assembly in said U-shaped cross-sectional configuration.]

[2. A container assembly in accordance with claim 1 wherein said center section has a plurality of openings extending therethrough.]

[3. A container assembly in accordance with claim 2 wherein said center section is plurally indented to provide a plurality of externally depending spacer buttons, the exterior surfaces of said center section spacer buttons providing a resting surface for enabling said center section to be spaced from a surface upon which said center section rests.]

[4. A container assembly in accordance with claim 1 wherein at least one of said first and second sections is indented to provide spacer buttons extending outwardly from its outer surface, said spacer buttons being provided to abut an adjacent container of like construction.]

[5. A container assembly in accordance with claim 4 wherein the other of said first and second sections is indented to provide spacer buttons extending outwardly from its outer surface and wherein said free end of said tab member overhangs said other of said edges and each of said spacer buttons extend outwardly at least one half the outward extent of said overhang.]

[6. A container assembly in accordance with claim 1 wherein the interior surfaces of said side sections contain ridges for retaining material placed in said container assembly.]

[7. A container assembly in accordance with claim 2 wherein said side sections are positioned at an acute angle with respect to said center section when said container is assembled.]

[8. A container assembly in accordance with claim 1 wherein said container assembly is made of an integrally formed member of expanded polystyrene sheet material.]

[9. A container assembly in accordance with claim 1 wherein the length of said tab is greater than the distance between said free edges of said container assembly when in assembled configuration.]

[10. A container assembly in accordance with claim 8 wherein the length of said tab is greater than the distance between said free edges of said container assembly when in assembled configuration.]

[11. An improved container assembly, comprising:

a member which when unassembled is in a generally planar configuration and has first and second side edges;

a plurality of hinge lines formed in said member each along the axis of said container from said first side edge to said second side edge for enabling said member to be folded into a predetermined shape and for dividing the member into a first section, a second section and a central section, said central section interconnecting said first and second sections; and each of said sections being formed with a plurality of hollow ribs formed by indentations therein spaced inwardly from said side edges and spaced one from another along the axis of said container, said ribs interacting when said member is folded along said hinge lines so as to form a structure of generally U-shaped cross-sectional configuration having a pair of free edges spaced one from the other which define the ends of said U-shaped configuration, and to divide said container into a plurality of discrete compartments;

said center section being plurally indented to provide a plurality of externally depending spacer buttons and having a plurality of openings extending therethrough, the exterior surfaces of said center section spacer buttons providing a resting surface for enabling said center section to be spaced from a surface upon which said center section rests.]

[12. A container assembly formed of a member which when unassembled is in a generally planar configuration and when assembled folds into a packaging device, said container assembly including a plurality of hinge lines formed in said member for enabling said member to be folded into a predetermined shape and for dividing said member into a first section, a second section and a central section interconnecting said first and second sections, each of said sections being formed with a plurality of indentations spaced one from another along the axis of said container, said indentations being formed in planes generally perpendicular to the axis of said container, all of said plural indentations in said first and second sections having top edge surfaces in a single plane, when assembled, and beveled inner end surfaces, opposing ones of said top edge surfaces abutting each other along their entire lengths, and said inner end surfaces abutting said central section indentations so as to form a generally U-shaped structure and to divide said container into a plurality of discrete completely enclosed compartments when said member is folded along said hinge lines.]

[13. An improved container assembly, comprising:

a member which when unassembled is in a generally planar configuration and has first and second side edges;

a plurality of hinge lines formed in said member each along the axis of said container from said first side edge to said second side edge for enabling said member to be folded into a predetermined shape and for dividing the member into a first section, a second section and a central section, said central section interconnecting said first and second sections; and each of said sections being formed with a plurality of hollow ribs formed by indentations therein spaced inwardly from said side edges and spaced one from another along the axis of said container, said ribs interacting when said member is folded along said hinge lines so as to form a structure of generally U-shaped cross-sectional configuration having a pair of free edges spaced one from the other which define the ends of said U-shaped configuration, and to divide said container into a plurality of discrete compartments;

said center section being plurally indented to provide a plurality of externally depending spacer buttons, the exterior surfaces of said center section spacer buttons providing a resting surface for enabling said center section to be spaced from a surface upon which said center section rests.]

*14. An improved container assembly for containing plants, seeds or seedlings in soil for shipment, comprising:*

*an integral one-piece member which when unassembled is in a generally planar configuration and has first and second side edges;*

*a plurality of hinge lines formed in said member each along the axis of said container from said first side edge to said second side edge for enabling said member to be folded into a predetermined shape and for dividing the member into a first section, a second section and a central section, said central section interconnecting said first and second sections, said first, second and central sections constituting at least the major surface areas of said container;*

*each of said sections being formed with a plurality of hollow ribs formed by indentations therein spaced inwardly from the side edges and spaced one from another along the axis of said container, said ribs interacting when said member is folded along said hinge lines so as to form a structure of generally U-shaped cross-sectional configuration, the interaction of the ribs formed in said side sections being along substantially their entire lengths so as to divide said container into a plurality of discrete compartments, said structure having a pair of free edges spaced apart from the other a distance defined by the interacting ribs of said side sections, said free edges defining the ends of said U-shaped configuration;*

*a tab member having a first end integrally formed with one of said edges, and a free end adapted to be positioned adjacent the other of said edges for retaining said assembly in said U-shaped cross-sectional configuration.*

*15. A container assembly in accordance with claim 14 wherein said center section has a plurality of openings extending therethrough.*

*16. A container assembly in accordance with claim 15 wherein said center section is plurally indented to provide a plurality of externally depending spacer buttons, the exterior surfaces of said center section spacer buttons providing a resting surface for enabling said center section to be spaced from a surface upon which said center section rests.*

*17. A container assembly in accordance with claim 15 wherein said side sections are positioned at an acute angle with respect to said center section when said container is assembled.*

*18. A container assembly in accordance with claim 14 wherein the interior surfaces of said side sections contain ridges for retaining material placed in said container assembly.*

*19. A container assembly in accordance with claim 14 wherein said container assembly is made of an integrally formed member of expanded polystyrene sheet material.*

*20. A container assembly in accordance with claim 19 wherein the length of said tab is greater than the distance between said free edges of said container assembly when in assembled configuration.*

*21. A container assembly in accordance with claim 14 wherein the length of said tab is greater than the distance between said free edges of said container assembly when in assembled configuration.*

*22. An improved container assembly comprising:*

*a member which when unassembled is in a generally planar configuration and has first and second side edges;*

*a plurality of hinge lines formed in said member each along the axis of said container from said first side edge to said second side edge for enabling said member to be folded into a predetermined shape and for dividing the member into a first section, a second section and a central section, said central section interconnecting said first and second sections;*

*at least one of said first and second sections being indented to provide spacer buttons extending outwardly from its outer surface, said spacer buttons being provided to abut an adjacent container of like construction;*

*each of said section being formed with a plurality of hollow ribs formed by indentations therein spaced inwardly from the side edges and spaced one from another along the axis of said container, said ribs interacting when said member is folded along said hinge lines so as to form a structure of generally U-shaped cross-sectional configuration having a pair of free edges spaced one from the other which define the ends of said U-shaped configuration, and to divide said container into a plurality of discrete compartments; and*

*a tab member having a first end integrally formed with one of said edges and a free end adapted to be positioned adjacent the other of said edges for retaining said assembly in said U-shaped cross-sectional configuration.*

*23. A container assembly in accordance with claim 22 wherein the other of said first and second sections is indented to provide spacer buttons extending outwardly from its outer surface and wherein said free end of said tab member overhangs said other of said edges and each of said spacer buttons extend outwardly at least one half the outward extent of said overhang.*

*24. An improved container assembly for containing plants, seeds or seedlings in soil for shipment, comprising:*

*an integral one-piece member which when unassembled is in a generally planar configuration and has first and second side edges;*

*a plurality of hinge lines formed in said member each along the axis of said container from said first side edge to said second side edge for enabling said member to be folded into a predetermined shape and for dividing the member into a first section, a second section and a central section, said central section interconnecting said first and second sections, said first, second and central sections constituting at least the major surface areas of said container; and*

*each of said sections being formed with a plurality of hollow ribs formed by indentations therein spaced inwardly from said side edges and spaced one from another along the axis of said container, said ribs interacting when said member is folded along said hinge lines so as to form a structure of generally U-shaped cross-sectional configuration having a pair of free edges spaced one from the other which define the ends of said U-shaped configuration, and to divide said container into a plurality of discrete compartments;*

*said center section being plurally indented to provide a plurality of externally depending spacer buttons and having a plurality of openings extending therethrough, the exterior surfaces of said center section spacer buttons providing a resting surface for enabling said center section to be spaced from a surface upon which said center section rests.*

*25. An improved container assembly for containing plants, seeds or seedlings in soil for shipment, comprising:*

*an integral one-piece member which when unassembled is in a generally planar configuration and has first and second side edges;*

*a plurality of hinge lines formed in said member, each along the axis of said container from said first side edge to said second side edge, for enabling said member to be folded into a predetermined shape and for dividing said member into a first section, a second section and a central section, said central section interconnecting said first and second sections, said first, second and central sections constituting at least the major surface areas of said container;*

*each of said sections being formed with a plurality of hollow ribs formed by indentations therein spaced inwardly from the side edges and spaced one from another along the axis of said container, said ribs interacting when said member is folded along said hinge lines so as to form a structure of generally U-shaped, cross-sectional configuration, the interaction of the ribs formed in said side sections being along substantially their entire length so as to divide said container into a plurality of discrete compartments, said structure having a pair of free edges spaced apart one from the other a distance defined by the interacting ribs of said side sections, said free edges defining the ends of said U-shaped configuration;*

*said center section being formed with a plurality of openings therethrough, at least one opening being provided for each of said discrete compartments; and*

*means for spacing the bottom of said central section from a support surface to permit drainage from said openings.*

* * * * *

Disclaimer

Reissue No. 29,248.—*Wayne Congleton*, Walnut, Calif. CONTAINER. Patent dated June 7, 1977. Disclaimer filed July 9, 1977 by the assignee, *Dolco Packaging Corporation.*

This term of this patent subsequent to Sept. 10, 1991 has been disclaimed.

[*Official Gazette August 23, 1977.*]